(12) United States Patent
Yamada et al.

(10) Patent No.: US 8,818,549 B2
(45) Date of Patent: Aug. 26, 2014

(54) CONTROLLER FOR MACHINE TOOL AND FIVE-AXIS SIMULTANEOUS CONTROL MACHINE TOOL CONTROLLED THEREBY

(75) Inventors: Yoshihiko Yamada, Anjo (JP); Atsushi Saito, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 605 days.

(21) Appl. No.: 12/853,614

(22) Filed: Aug. 10, 2010

(65) Prior Publication Data

US 2011/0044778 A1   Feb. 24, 2011

(30) Foreign Application Priority Data

Aug. 24, 2009   (JP) .................................. 2009-193143

(51) Int. Cl.
*G06F 19/00* (2011.01)

(52) U.S. Cl.
USPC ............. 700/186; 318/569; 409/80; 409/209; 483/16; 483/62

(58) Field of Classification Search
USPC ......... 700/186, 188, 192; 483/18, 62; 318/10, 318/11, 14, 563, 568.18, 569, 572; 409/80, 409/209
See application file for complete search history.

(56) References Cited

U.S. PATENT DOCUMENTS

| | | | |
|---|---|---|---|
| 6,111,382 A | 8/2000 | Tsutsui | |
| 6,252,368 B1 * | 6/2001 | Sugie | 318/568.22 |
| 2002/0084763 A1 * | 7/2002 | Shibukawa et al. | 318/569 |
| 2009/0191017 A1 * | 7/2009 | Wember | 409/209 |
| 2010/0244762 A1 * | 9/2010 | Mori et al. | 318/632 |

FOREIGN PATENT DOCUMENTS

| | | |
|---|---|---|
| EP | 1 195 665 A2 | 4/2002 |
| JP | 61-156309 | 7/1986 |
| JP | 9-81216 | 3/1997 |
| JP | 2000-311010 | 11/2000 |
| JP | 2002-157007 | 5/2002 |
| JP | 2006-195664 | 7/2006 |
| JP | 2008-90734 | 4/2008 |

OTHER PUBLICATIONS

Office Action issued Jul. 27, 2012 in European Application No. 10 173 677.5.
Extended European Search Report issued Jul. 1, 2011, in European Patent Application No. 10173677.5.
M. Sharif Uddin, et al., "Prediction and Compensation of machining geometric errors of five-axis machining centers with kinematic errors", Precision Engineering, vol. 33, No. 2, XP-025937601, Apr. 1, 2009, pp. 194-201.
U.S. Appl. No. 12/768,123, filed Apr. 27, 2010, Yamada.
Office Action issued on Aug. 6, 2013 in Japanese Application No. 2009-193143 with English translation.

* cited by examiner

*Primary Examiner* — Mohammad Ali
*Assistant Examiner* — Sheela S Rao
(74) *Attorney, Agent, or Firm* — Oblon, Spivak, McClelland, Maier & Neustadt, L.L.P.

(57) ABSTRACT

A controller including a detecting member detecting a machining position where a pivoting axis is reversed in machining by the machine tool based on the control data, an allowable position error setting member setting an allowable position error between a commanded machining position and an actual machining position, an allowable acceleration deciding member deciding the allowable acceleration about the pivoting axis based on a distance from the machining position of the reversed axis to a center of the pivoting axis and based on the allowable position error being set, and a controlling member controlling a velocity about the driving axis based on the allowable acceleration.

16 Claims, 8 Drawing Sheets

ALLOWABLE POSITION ERROR AND

ALLOWABLE ANGULAR ERROR AT STRAIGHT LINE SEGMENT

ALLOWABLE POSITION ERROR AND

ALLOWABLE ANGULAR ERROR AT CORNER SEGMENT

ALLOWABLE POSITION ERROR AND

ALLOWABLE ANGULAR ERROR AT CURVED SEGMENT

CONTROLLER FOR MACHINE TOOL AND FIVE-AXIS SIMULTANEOUS CONTROL MACHINE TOOL CONTROLLED THEREBY

INCORPORATION BY REFERENCE

The present application claims priority under 35 U.S.C. §119 to Japanese Patent Application No. 2009-193143, filed on Aug. 24, 2009. The content of this application is incorporated herein by reference in the entirety.

BACKGROUND OF THE INVENTION

1. Field of the Invention

The present invention relates to a controller for a machine tool and a five-axis simultaneous control machine tool controlled thereby. The controller for the machine tool controls a driving motor for a driving axis of the five-axis simultaneous control machine tool having at least a linear axis and a rotational axis.

2. Description of the Prior Art

The machine tool machines a workpiece by controlling a position of each of driving axes by a controller. There happens to generate any quadrant projection caused by an axis reversing of the driving axis, thereby to reduce machining accuracy. It is disclosed in the laid-open patent publication of Tokkaihei 09-81216 that a method reduces the generation of the quadrant projection by deciding an acceleration amount of a backlash in accordance to a machining condition.

Nowadays, a five-axis simultaneous control machine tool is generally improved to higher specifications as shown in the laid-open patent publication of Tokkai 2008-090734.

In this prior five-axis simultaneous control machine tool, it has same reduction of the machining accuracy because of the axis reversing about the driving axis even though a machining track is a straight line. There is known the five-axis simultaneous control machine tool having a rotating axis pivoting a supporting member that supports an endmil as a tool. In machining by the five-axis simultaneous control machine tool pivoting a supporting member supporting a tool, it happens to increase the machining error by the quadrant projection according to a distance from a machining position to a center of the pivoting axis during the pivoting movement of the supporting member when the machine tool has the pivoting axis to pivot the supporting member.

SUMMARY OF THE INVENTION

In view of the previously mentioned circumstances, it is an object of the present invention to provide a controller for a machine tool and a five axis simultaneous control machine tool controlled thereby which can improve machining accuracy in machining by controlling a driving axis including a linear axis and a pivoting axis.

In order to achieve the above and other objects, first aspect of the present invention provides a controller for a machine tool by driving any of motors for driving axes including a linear axis and a pivoting axis based on a control data, the controller for the machine tool comprising a detecting member detecting the machining position where the pivoting axis is reversed in machining by the machine tool based on the control data, an allowable position error setting member setting an allowable position error between a commanded machining position and an actual machining position, an allowable acceleration deciding member deciding the allowable acceleration about the pivoting axis based on a distance from the machining position of the reversed axis to a center of the pivoting axis and based on the allowable position error being set, and a controlling member controlling a velocity about the driving axis based on the allowable acceleration.

The controller for the machine tool according to the first aspect of the present invention detects the machining position of the reversed axis of the pivoting axis and controls the velocity about the driving axis including the pivoting axis relative to the machining position. The controller for the machine tool controls the machining position and the machining attitude of the tool relative to the workpiece by driving the driving axis based on the control data. The machining position of the tool is a position on the machining track of the tool moving relatively to the workpiece on a basis of the plural position commanding values included in the control data. The machining attitude of the tool is a vector of the tool at the machining position and is controlled by a movement by the pivoting axis. The "machining position of the reversed axis" is the position of the axis reversing where a velocity about the driving axis of the reversed axis is zero in the machining track and is represented by a coordinate value of the linear axes of an X-axis, a Y-axis, a Z-axis at a machine coordinate or a workpiece coordinate.

The allowable acceleration in controlling the velocity about the driving axis is a value being allowable volume of the acceleration including reduction of the velocity. The allowable acceleration is decided on a basis of the distance from the detected machining position of the reversed axis to the center of the pivoting axis and on a basis of the allowable position error being set. The allowable position error is an error of the actual machining position from the commanded machining position allowable to achieve the demanded machining accuracy. It is well known that the machining error based on the axis reversing depends on the acceleration about the driving axis with the axis reversing. In other words, it depends on the volume of the reduction rate of the velocity until the velocity at the machining position of the reversed axis reaches zero. More over in machining by controlling the driving axis, the larger the distance between the machining position of the reversed axis and the center of the pivoting axis is, the larger the error by the axis reversing is.

Therefore, the first aspect of the present invention can control correctively the velocity of the pivoting axis by deciding the allowable acceleration on a basis of the distance and the allowable position error. Thereby, it can restrain the generation of the machining error by the axis reversing of the pivoting axis so that it can improve the machining accuracy.

In this case, the position commanding value commanding the machining position of the reversed axis is detected by the controller from the control data or the NC program. The controlling member controls the velocity for machining by more than one position commanding values commanding the machining position of the reversed axis of the pivoting axis from plural position commanding values included in the control data. Thereby, it can restrain the velocity control adding any unnecessary reduction of the velocity to all over the control datum for reducing the machining error by the axis reversing. Therefore, it can reduce the machining time compared to the case where the velocity commanding value for machining is reduced all over the control datum for reducing the machining error by the axis reversing.

The controller for the machine tool detects the position commanding value commanding the machining position of the reversed axis from the control data. In other example, the driving axis of the axis reversing is the pivoting axis and the position commanding value for each of driving axes included in the NC program in the workpiece coordinate coincides with the position commanding value from the construction of the machine tool. In this case, the controller may detect the machining position of the reversed axis from the NC program. Therefore, the detecting member detects the machining position of the reversed axis and detects the position commanding value commanding the machining position from the control data or the NC program. The controller may have same effects to the above-identified one by the way of controlling the velocity by the controlling member for machining by the detected position commanding value.

The second aspect of the controller for the machine tool according to the first aspect comprises an allowable angular error calculating member calculating an allowable angular error of a difference between a commanded angle of the pivoting axis and an actual angle of the pivoting axis based on the allowable position error and the distance, and the allowable acceleration deciding member decides the allowable acceleration about the pivoting axis based on the allowable angular error. The allowable acceleration about the pivoting axis corresponds to an angular acceleration of the pivoting axis, therefore it is easy to decide any relationship to the allowable angular error of the pivoting axis. Thereby, it can decide the allowable acceleration about the pivoting axis more precisely by calculating the allowable angular error of the pivoting axis based on the allowable position error.

The third aspect of the controller for the machine tool according to the first aspect further comprises a machine character memorizing member memorizing a machine character of the machine tool being previously set based on an actual position difference between the commanded machining position and the actual machining position measured in an actual operation of the machine tool, the machine character is a character having the allowable acceleration being different in accordance to a construction of the machine tool, the allowable acceleration deciding member decides the allowable acceleration about the pivoting axis based on the machine character and the allowable position error. In general, there are different machine characters in the machine tool having a tilting axis of the tool for the pivoting axis and in the machine tool having the tilting table supporting the workpiece for the pivoting axis. The machine character is a unique character depending on the machine tool itself, therefore it may be different among the same construction of the machine tool. Therefore, the third aspect of the present invention measures the actual position error between the commanded position and the actual machining position and sets the machine character of the machine tool based on the measured actual position error. Thereby, it can decide the more corrective allowable acceleration reflecting the machine character so that it can restrain the machining error by the axis reversing steadily in controlling the velocity for the driving axis.

The fourth aspect of the controller for the machine tool according to the first aspect provides that the allowable acceleration deciding member decides the allowable acceleration about the pivoting axis based on the allowable position error and a machining profile at the machining position of the reversed axis being detected. In general, there are plural machining profiles of a straight line segment, a corner segment, a curved segment and so on in the workpiece machined by the tool. The machining profile gives different influences to volumes of the machining error by the axis reversing about the driving axis and to the machining accuracy. Therefore, the fourth aspect of the controller for the machine tool decides the more correct allowable acceleration based on the machining profile and the allowable position error by deciding the machining profile at the detected machining position of the reversed axis. For example, it reduces the machining time compared to the case controlling to reduce uniformly the velocity by reducing the amount of velocity reduction at the corner segment where there is relatively small machining error by the axis reversing at the machining position of the reversed axis in all machine profiles.

The fifth aspect of the controller for the machine tool provides that the controlling member controls the velocity by amending a velocity commanding value of the tool relative to the workpiece at the detected machining position of the reversed axis on a basis of a commanding velocity calculated from the velocity commanding value about the driving axis and based on a moving velocity about the driving axis calculated from the allowable acceleration. The controller calculates the commanding velocity of the reversed pivoting axis from the velocity commanding value of the moving velocity of the tool relative to the workpiece. Next it calculates the moving velocity of the driving axis at a beginning machining position in order that the acceleration is within the allowable acceleration in controlling the velocity from the beginning machining position to the machining position of the reversed axis. And the controller amends the velocity commanding value based on the commanding velocity and the moving velocity about the pivoting axis of the reversed axis. In this case, the controlling member decides the amending value of the velocity commanding value for all of the driving axes based on the commanding velocity and the moving velocity about the reversed pivoting axis. Thereby, the driving axis can be sufficiently reduced the velocity at the beginning machining position in order to reduce the acceleration within the allowable acceleration in controlling the velocity to the machining position of the reversed axis.

The sixth aspect of the present invention provides the five-axis simultaneous control machine tool mainly providing that a spindle housing supporting a tool and a table mounting the workpiece are moved relatively along three linear axes and also pivoted relatively around two pivoting axes, and the controller according to one of the above-identified aspects. Therefore, the sixth aspect of the present invention can achieve same effects to that of the above-identified aspects in the five-axis simultaneous control machine tool.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 8A is in a straight line segment, FIG. 8B is in a corner segment and FIG. 8C is in a curved segment.

DETAILED DESCRIPTION OF THE PREFERRED EMBODIMENTS

Embodiments of the controller for the machine tool and the five-axis simultaneous control machine tool controlled thereby according to the present invention will be explained hereinafter referred to Figures. One example of the machine tool according to the present invention is explained about a five-axis simultaneous control machining center having two rotational axes of A-axis and B-axis, and three linear axes of X-, Y-, Z-axis constructing a rectangular coordinates axes.

[Construction of a Machine Tool 1]

Figure 1:
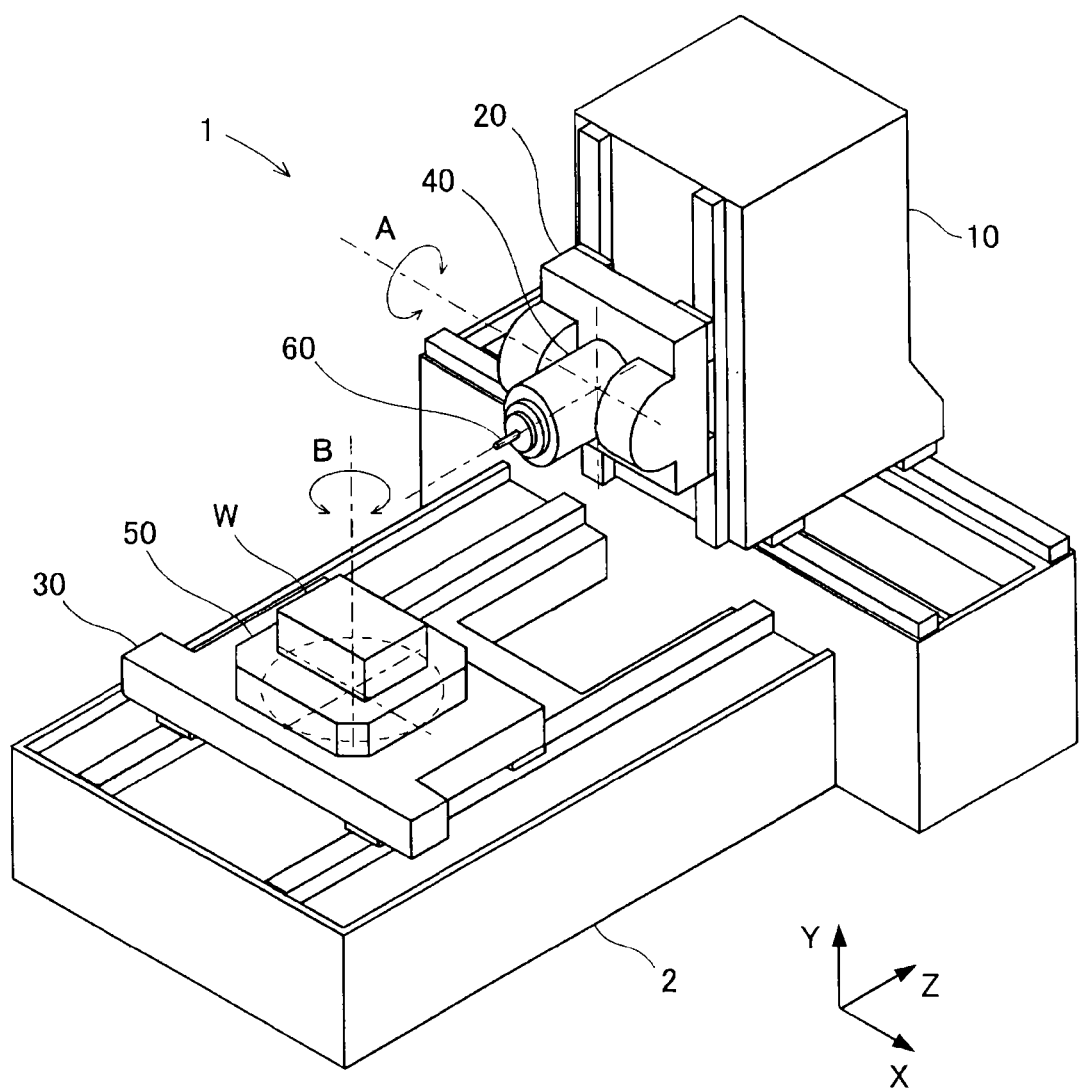
FIG. 1 is a drawing showing an outline of a machine tool 1.
Figure 2:
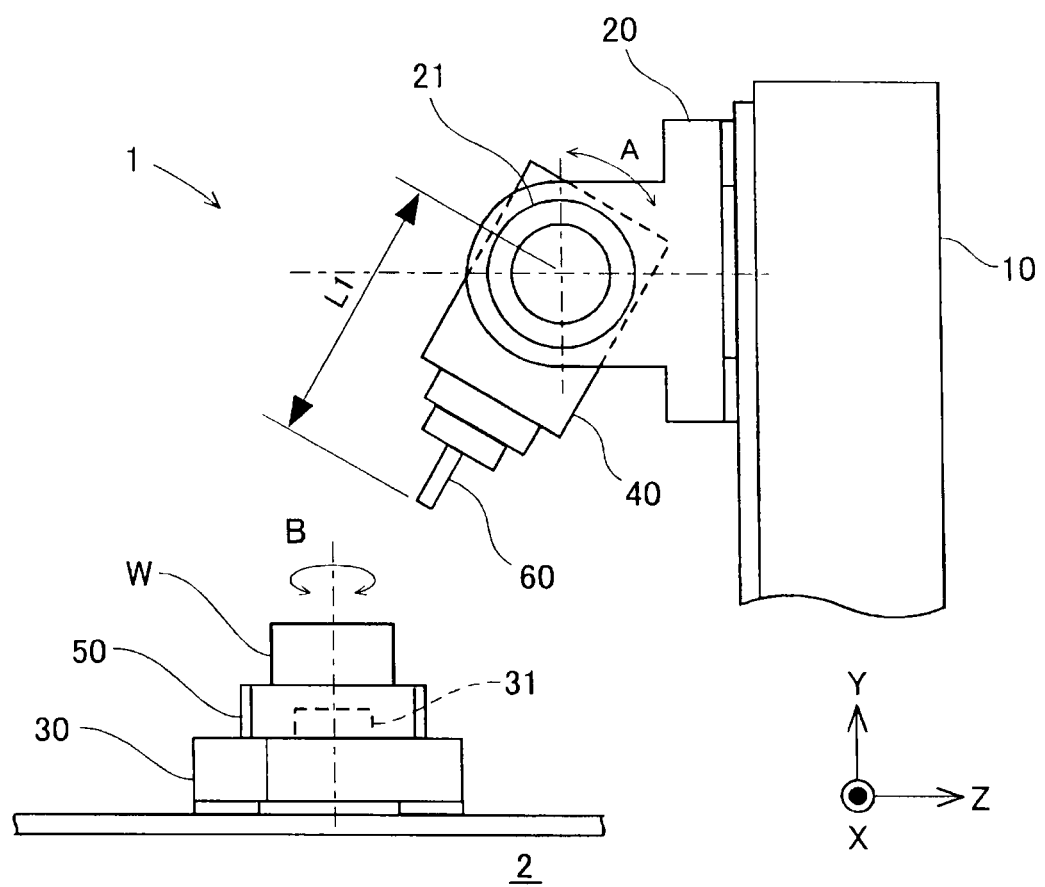
FIG. 2 is a schematic diagram showing a construction of the machine tool 1.

The machining center controlled by the controller for the machine tool of the one embodiment will be explained herein referred to FIG. 1 and FIG. 2. As shown in FIG. 1, the machine tool 1 of the five-axis simultaneous control machining center of the embodiment provides a bed 2, an X-axis movable member 10, a Y-axis movable member 20, a Z-axis movable member 30, a spindle housing 40, a rotating table 50 and a tool 60. In the machine tool 1 of the five-axis simultaneous control machining center of the embodiment, the tool 60 is constructed to be pivoted along a direction of the A-axis on the Y-axis movable member 20 supporting the spindle housing 40, a workpiece W is constructed to be rotated along a direction of the B-axis by the rotating table 50 mounting the workpiece W. The bed 2 is mounted on a floor to include two pairs of rails along the X-axis and the Y-axis, and the workpiece W is a workpiece to be machined by the machine tool 1.

The X-axis movable member 10 is a column mounted on rails along the X-axis direction on the bed 2 and the column is movable along the X-axis relatively to the bed 2. On rails at a side of the X-axis movable member 10 are mounted the Y-axis movable member 20 along the Y-axis direction vertically to the floor and the Y-axis movable member 20 is movable along the Y-axis relatively to the X-axis movable member 10 by a rotational driving of an un-illustrated Y-axis motor fixed to the X-axis movable member 10. The Z-axis movable member 30 is mounted on rails of the bed 2 along the Z-axis direction and the Z-axis movable member 30 is movable along the Z-axis direction relatively to the bed 2.

The spindle housing 40 is pivot-ably supported by the Y-axis movable member 20 along the rotational direction of an A-axis around the X-axis. The spindle housing 40 pivots along the rotational direction of the A-axis by a rotational driving of an A-axis motor 21 fixed to the Y-axis movable member 20. The spindle housing 40 includes a hollow cylindrical housing supported by the Y-axis movable member 20 and a rotating spindle accommodated in a hollow cylindrical housing rotatably around an axis of the spindle housing 40 in respect to the hollow cylindrical housing. The rotating table 50 is rotatably supported by the Z-axis movable member 30 along the rotational direction of the B-axis around the Y-axis. The rotating table 50 is rotated along the rotational direction of the B-axis by a rotational driving of a B-axis motor 31 fixed to the Z-axis movable member 30.

The tool 60 is fixed to a nose of the rotating spindle of the spindle housing 40 to be continuously rotated with the rotation of the rotating spindle. The tool 60 is for example a ball endmill, an endmill, a drill or a tap. Therefore, the machine tool 1 of the five-axis simultaneous control machining center of the one embodiment of the present invention is constructed so that the tool 60 is movable along linear directions of the X-axis and Y-axis relatively to the bed 2, the tool 60 is pivoted along the rotational direction of the A-axis and the workpiece W is movable along a linear direction of the Z-axis and rotated along the rotational direction of B-axis.

"Construction of a Controller 100"

Figure 3:
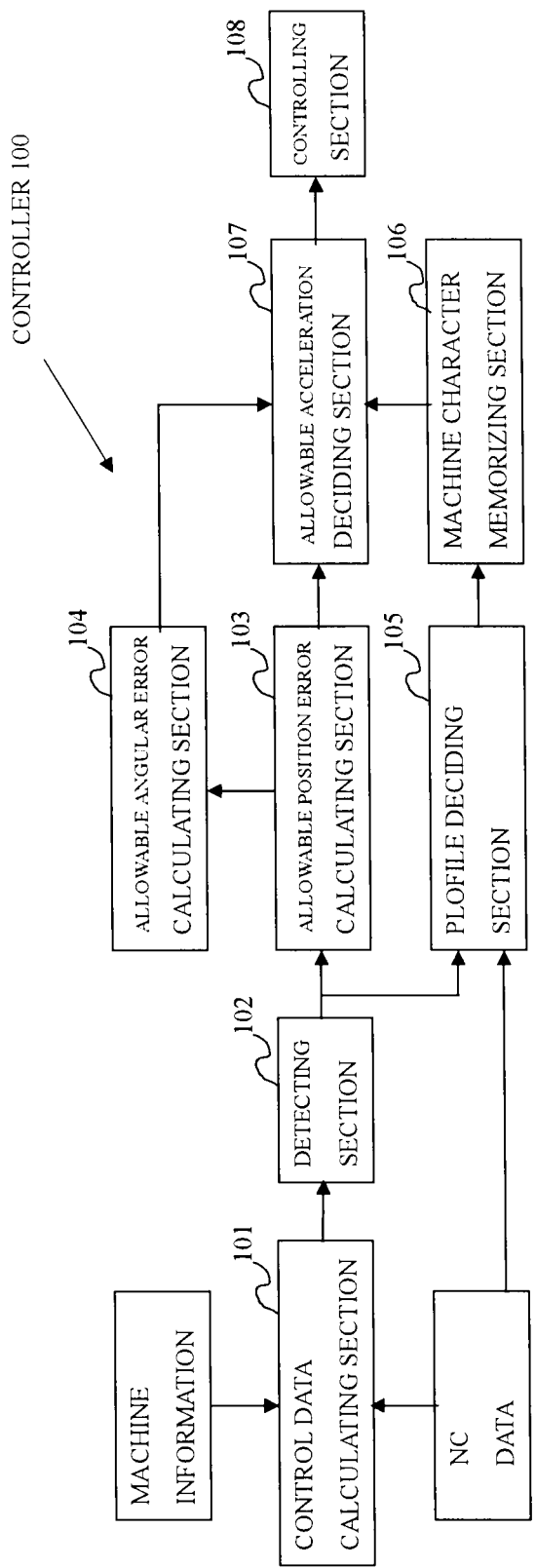
FIG. 3 is a block diagram showing a controller 100 for the machine tool 1.

A construction of a main portion of the controller for the five-axis simultaneous machining center will be explained here referred to FIG. 3. As shown in FIG. 3 the controller 100 includes a control data calculating section 101, a detecting section 102, an allowable position error setting section 103, an allowable angular error calculating section 104, a profile deciding section 105, a machine character memorizing section 106, an allowable acceleration deciding section 107 and a controlling section 108.

The control data calculating section 101 calculates a control data controlling by the controller 100 a machining position and a machining attitude of the tool 60 relative to the workpiece W by driving the motors for any of driving axes of the linear axes of the X-axis, Y-axis, Z-axis and the rotational axes of the A-axis and the B-axis at a machining by the machine tool 1. The control data is a machining data including a position commanding value in the machine coordinates system to control each of driving axes of the machine tool 1, a velocity commanding value of a tool feeding velocity relative to the workpiece, etc. The position commanding value relates to an actual position of each of driving axes in the machine tool 1.

The position commanding value is a commanded machining position in the machine coordinates system calculated on a basis of a program of a numerical controller in a workpiece coordinates system and various machining information. The various machining information are a construction of the driving axis, a position information of the workpiece mounted on the table, a length of the tool used for machining etc. in the machine tool 1. The position commanding value is able to be translated from each coordinates system to other. Therefore, while the control data is constructed by the machine coordinates system, however it may be constructed that the control data may be constructed by a position commanding data translated to the workpiece coordinates system further.

The detecting section 102 detects the machining position where any driving axis of the linear axes or the rotational axes changes an urged direction to a reversed direction at the machining by the machine tool 1 according to control datum. Therefore, the "machining position of the reversed axis" is a position where a velocity of the motor for the driving axis is zero. The machining position of the reversed axis is also called as a "position of the reversed axis".

It happens that the position commanding value commands to reverse the direction of any driving axis. For example, the rotational direction of the A-axis motor 21 pivoting the spindle housing 40 is reversed where the tool 60 is moved relatively to the workpiece W from the present position to certain commanded position. Two examples will be explained here, one example will be explained referred to FIG. 4 and the other will be explained without any drawings.

Figure 4:
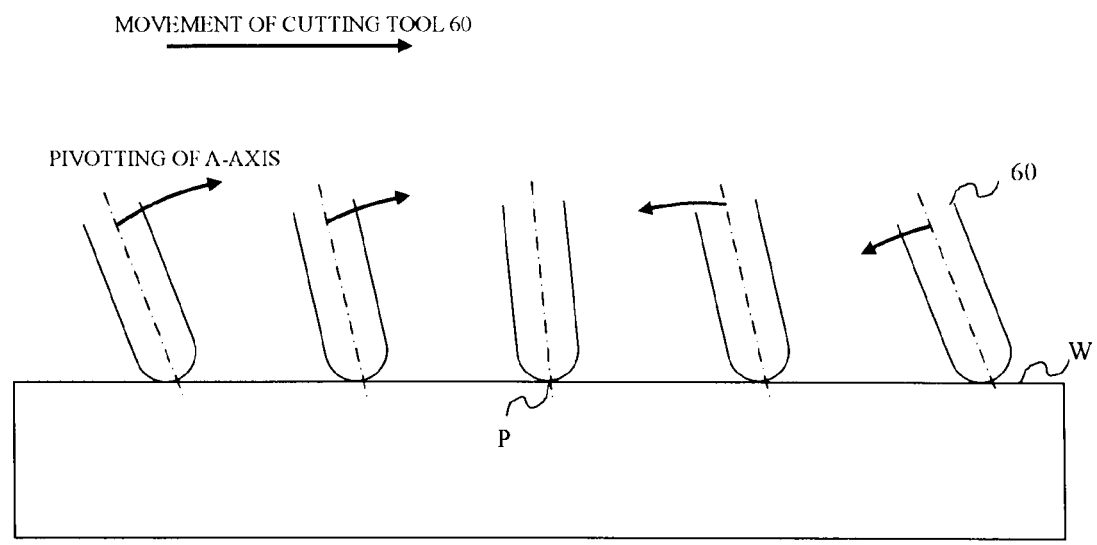
FIG. 4 is an explanatory diagram showing a machining position of a reversed axis.

One linear axis of the Y-axis is driven to move the cutting tool 60 to a right direction and one rotational axis of the A-axis is pivoted to a clockwise direction relatively to the workpiece W as shown in FIG. 4. After the cutting tool 60 passed a point P, it should be occurred for a special machining that the tool 60 is rotated to a reversed direction as a counter clockwise direction so that the rotational direction of the A-axis motor 21 is reversed, that is to say a quadrant of the rotation is switched. The point P is the "machining position of the reversed axis" in the linear movement to switch the quadrant.

For the other example, the five-axis contouring control machine tool can machine the workpiece W having a complex curved surface. In this complex curved surface machining an attitude of the tool 60 is maintained at same contacting angle relative to the workpiece W even though the surface of the workpiece W is complexly curved so that the rotational direction of the A-axis motor 21 is frequently changed to the clockwise and counter clockwise directions according to the curved surface during one pass of machining, that is to say there are plural quadrant switching point. There exist a lot of the "machining positions of the reversed axis" in the pivoting movement to switch the quadrant.

The detecting section 102 detects as the "machining position of the reversed axis" the machining position where the rotational direction of the A-axis motor 21 is reversed at the commanded machining position by the position machining value. As a result, the detecting section 102 also detects at this moment the position commanding value commanding the machining position of the reversed axis. In same way, the detecting section 102 detects a plurality of machining positions of the reversed axes where plural driving axes are reversed by the single position commanding value. Therefore, while the above-identified two examples show the reversed direction of the rotational axis, it might be possible that the moving direction along one linear axis or more linear axes of the X-, Y-, Z-axis is or are reversed.

The allowable position error setting section 103 is an allowable position error setting member setting an allowable position error Δ between a commanded machining position P1 and an actual machining position P2. A desirably ideal state is the actual machining position P2 equals to the commanded machining position P1. However it is frequently happened that the actual machining position P2 is offset from the commanded machining position P1. The difference between two positions P1 and P2 affects to a machining accuracy badly.

One of factors causing the happened offset between two positions P1 and P2 follows a pivoting movement around the pivoting axis of the A-axis or the B-axis. Concretely, the spindle housing 40 and the rotational table 50 are respectively pivoted by the rotational commands of the A-axis and B-axis when each of them is output. The actual machining position P2 is shifted to be delayed slightly from the commanded machining position P1 because of a control error to the pivoting axis. Especially, the longer a distance L1 or L2 from the pivoting axis of the A-axis or the B-axis to the actual machining position P2 is, the larger its shifted amount is. Therefore, here is set the allowable position error Δ as an allowable value between the commanded machining position P1 and the actual machining position P2. In other words, the allowable position error Δ is set so that the enough satisfied machining accuracy is obtained under the condition that the actual difference between the commanded machining position P1 and the actual machining position P2 is within the allowable position error Δ.

Figure 5:
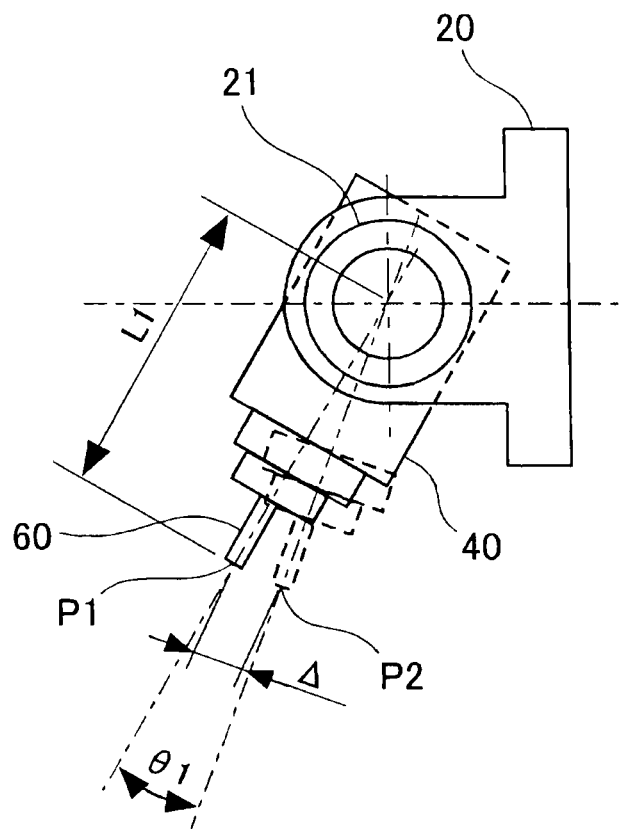
FIG. 5 is an explanatory diagram of an allowable position error Δ and an allowable angular error θ1 about an A-axis.
Figure 6:
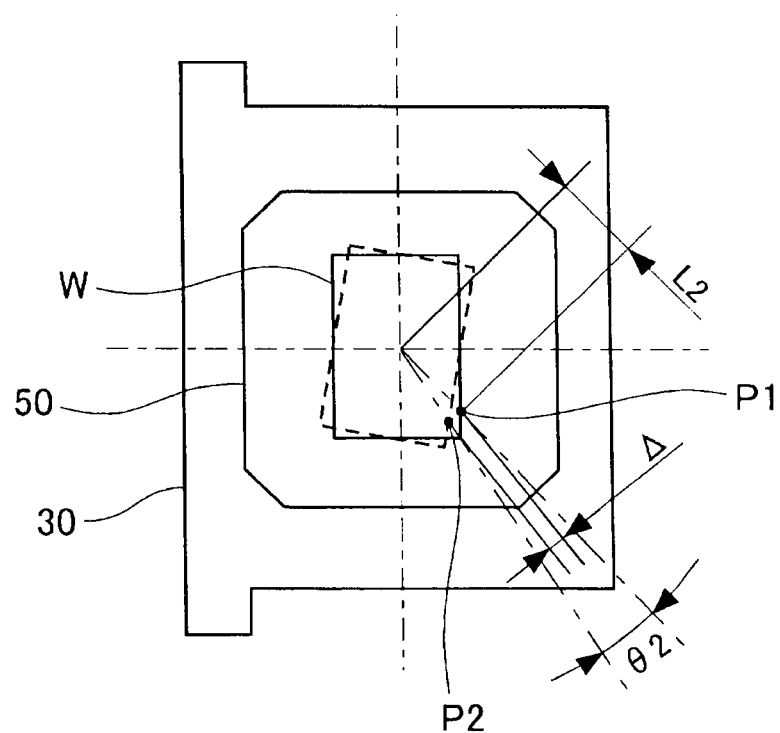
FIG. 6 is an explanatory diagram of an allowable position error Δ and an allowable angular error θ2 about a B-axis.

Here is explained in supplemental the commanded machining position P1, the actual machining position P2 and the allowable position error Δ referred to FIG. 5 and FIG. 6. As the commanded machining position P1 is shown by a solid line in FIGS. 5 and 6, the commanded machining position P1 is the machining position output from the controller 100 based on the control data, that is to say the commanded value of the nose position of the tool 60. As the actual machining position P2 is shown by a dashed line in FIGS. 5 and 6, the actual machining position P2 is the actual nose position of the tool 60 contacting with the workpiece W. As shown in FIGS. 5 and 6, it is happened to create any shift of the actual machining position P2 from the commanded machining position P1.

The allowable value of the position difference between the commanded machining position P1 and the actual machining position P2 is preset as the allowable position error Δ as shown in FIGS. 5 and 6.

The allowable angular error calculating section 104 is an allowable angular error calculating member calculating an allowable angular error θ1 or θ2 being a difference between the commanded angle and the actual angle. The distance L1 is defined as a distance of the commanded machining position P1 from the pivoting axis of the A-axis as shown in FIG. 5. The distance L2 is defined as a distance of the commanded machining position P1 from the pivoting axis of the B-axis as shown in FIG. 6. For example, the detecting section 102 detects the machining position of the reversed axis with the reversing movement of the A-axis. In this case, the allowable angular error calculating section 104 calculates an allowable angular error θ1, shown in FIG. 5, being the difference of the actual angle from the commanded angle based on the distance L1 and the allowable position error Δ about the A-axis. In same way, for example, the detecting section 102 detects the machining position of the reversed axis with the reversing movement of the B-axis. In this case, the allowable angular error calculating section 104 calculates an allowable angular error θ2, shown in FIG. 6, being the difference of the actual angle from the commanded angle based on the distance L2 and the allowable position error Δ about the B-axis. The allowable angular errors θ1, θ2 are calculated in accordance with two next equations 1 and 2.

$$\theta 1 = \arc\sin(\Delta/L1) \quad \text{Equation 1}$$

$$\theta 2 = \arc\sin(\theta/L2) \quad \text{Equation 2}$$

These equations 1, 2 are established where the distance L1 of the commanded machining position P1 from the pivoting axis of the A-axis is different according to a length of each of the tool 60. Therefore, the allowable angular errors θ1 is calculated in accordance with the changed tool 60 when the tool 60 is changed. And also, these equations 1, 2 are established where the distance L2 of the commanded machining position P1 from the pivoting axis of the B-axis is different according to the commanded machining position by the position commanding value. Therefore, the allowable angular errors θ1 is calculated in accordance with each of the "position of the reversed axis" detected by the detecting section 102.

The profile deciding section 105 decides a profile of the workpiece W at the machining position of the reversed axis detected by the detecting section 102 within a machining locus of the tool 60. The machining locus of the tool 60 is a locus moving the tool 60 relatively to the workpiece W during the machining in the machine tool 1 based on the control data. The control data and the NC program are machining datum having a plurality of position commanding values. Therefore, the machining locus of the tool 60 is presented by combining each adjacent position of the position commanding value with a line segment or a curved segment.

It needs to calculate the machining locus on a basis of the position commanding value of each of the driving axes of the X-, Y-, Z-, A-, B-axis in order to present the machining locus from the control datum. On the other hand, in order to present the machining locus from the NC program, it is relatively easy to calculate the machining locus on a basis of the position commanding value of each of the linear axes of the X-, Y-, Z-axis since rotational axes of the A-axis and the B-axis command the machining attitude of the tool 60.

Figure 7:
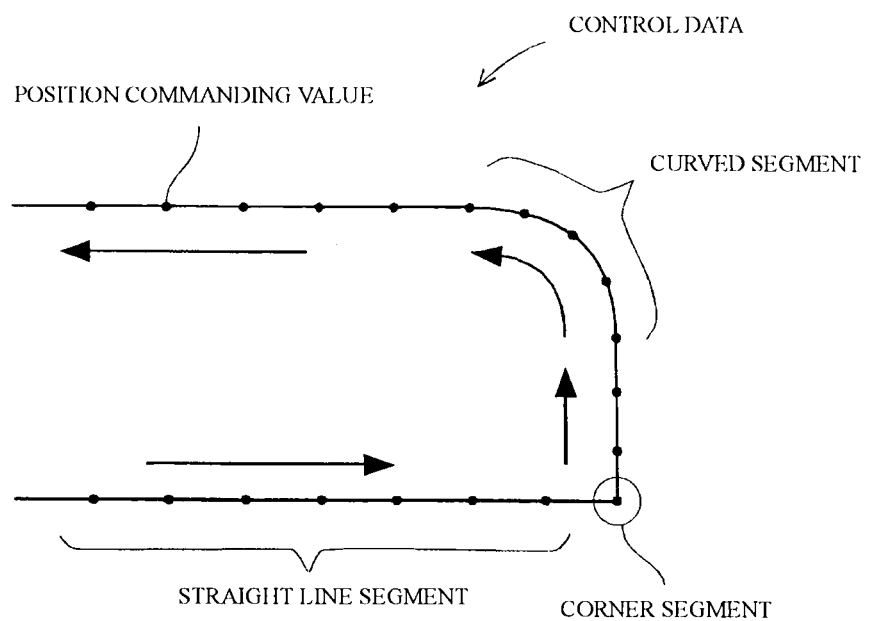
FIG. 7 is a drawing showing a machining track of machining by the machine tool 1 based on a control data.

The machining locus of the tool 60 will be explained referred to FIG. 7. The machining locus includes the machining profile of a straight line segment, a corner segment and a curved segment as shown in FIG. 7. The workpiece W is machined to a plane surface or a curved surface as a target profile by machining each small segment in a line to the machining locus.

A machining error based on the axis reversing of the driving axis is variable in accordance with each of machining profiles. This is the reason that the machining influence rate to the machining accuracy by the machining error is different by each machining profile even though the workpiece is machined with the axis reversing of the driving axis. For example, it is affected largely to the machining accuracy by the small error of machining due to the axis reversing even in machining the straight line segment of the workpiece. On the other hand, there is relatively small affection to the machining accuracy by the error of machining due to the axis reversing in machining the corner segment of the workpiece. Therefore, it is best to decide an allowable acceleration in accordance to the machining profile at the position of the reversed axis.

The profile deciding section 105 is input from a NC program three position commanding values of single position commanding value commanding the detected position of the reversed axis and two position commanding values one before and after the single position commanding value. The single position commanding value is the position commanding value commanding to pass the position of the reversed axis or the position commanding value corresponding to the position of the reversed axis. These three position commanding values are the position commanding value of the linear axes involved in the NC program. Then the profile deciding section 105 calculates a relative angle of the tool 60 to the machining locus on a basis of the three position commanding values being input and thereby compares the relative angle to a predetermined angle to judge the machining profile at the position of the reversed axis.

While in the one embodiment of the present invention the machining profile is judged in above-explained method, however it may be judged the machining profile at the position of the reversed axis by a curvature radius calculated with three above-identified positions or more than three positions, plural position commanding values including one before and after the position, a relationship of the other machining locus parallel to the machining locus, a target profile corresponding to the machining locus and so on. While each of the position commanding values is input from the NC program, however it may be constructed that each of the position commanding values is input from the control datum to calculate the relative angle of the tool 60 to the machining locus in accordance with the position commanding values being input in this way.

The machine character memorizing section 106 is a machine character memorizing member memorizing each of machine characters of the machine tool 1 according to the machining profile. The machine character is explained here referred to FIG. 8. The machine character is a character that the allowable acceleration is different in accordance with a construction of the machine tool 1. The machine character is different based on the difference of the construction of various machine tools and shows a character being characteristic of own machine tool. The machine character is preset by operating any movements with the axis reversing in the machine tool 1, measuring any actual position differences between the commanded machining position and the actual machining position of the driving axis by a feedback signal, and analyzing the actual position differences.

Figure 8A:
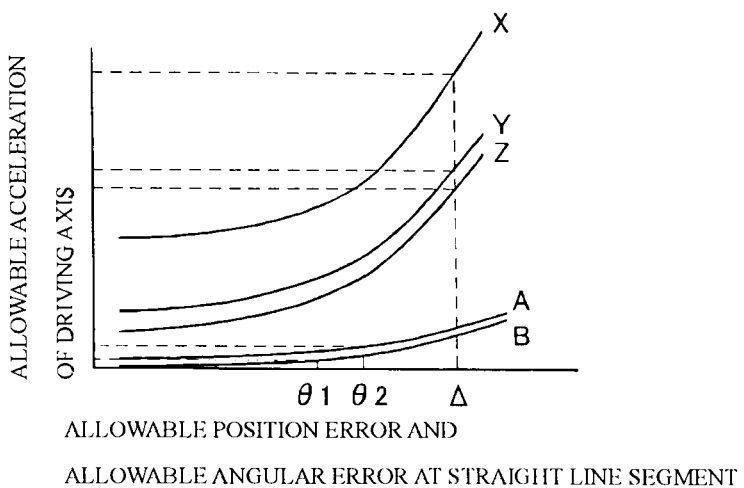
FIG. 8A to 8C are graphs showing a machine character in each of machine profiles.
Figure 8B:
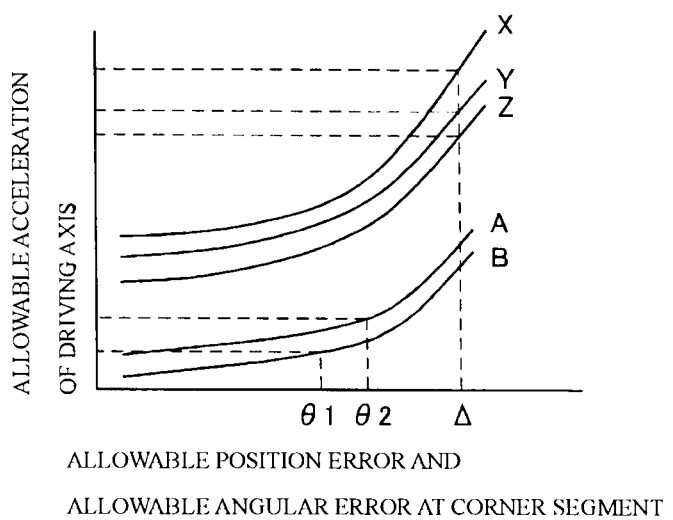
Figure 8C:
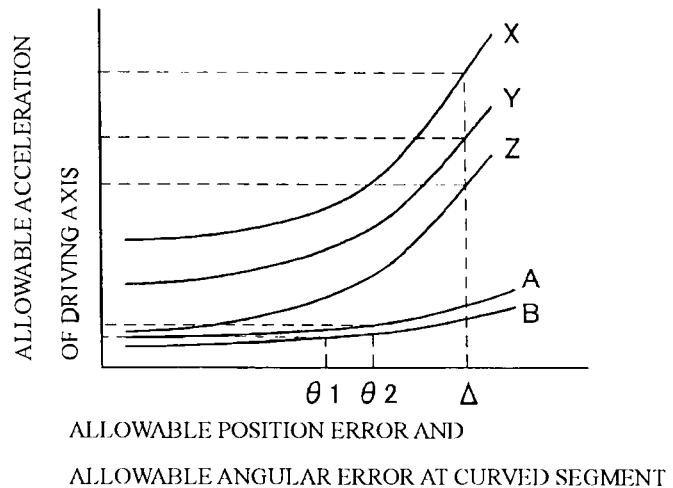

In the machine character, the allowable acceleration of the driving axis is also different based on the machining profile at the position of the reversed axis. Therefore, the machine character memorizing section 106 memorizes each machine character corresponding to the machining profile at the position of the reversed axis judged by the profile deciding section 105 as shown in FIGS. 8A, 8B and 8C. It should be needed to reduce the velocity for the driving axis at a small acceleration until the position of the reversed axis because it is affected largely to the machining accuracy by the small machining error due to the axis reversing during machining the straight line segment of the workpiece as explained above.

Therefore, as shown in FIG. 8A, allowable accelerations of the A-axis and the B-axis are smaller compared to the acceleration at the corner segment shown in FIG. 8B and at the curved segment shown in FIG. 8C. It is acceptable to reduce the velocity for the driving axis at a relatively large acceleration until the position of the reversed axis because there is relatively small affection to the machining accuracy by the machining error due to the axis reversing in machining the corner segment of the workpiece. Therefore, as shown in FIG. 8B, acceptable accelerations of the A-axis and the B-axis are larger compared to the acceleration at the curved segment shown in FIG. 8C.

The allowable acceleration deciding section 107 is an allowable acceleration deciding member deciding the allowable acceleration of the driving axis on a basis of the machine character. Here is explained to decide by the allowable acceleration deciding section 107 the allowable acceleration of the A-axis (or the B-axis) being the rotational axis. At first, the allowable angular error calculating section 104 calculates the allowable angular error θ1 (or θ2) on a basis of the allowable position error Δ and the distance L1 (or L2) of the commanded machining position P1 to the center line of the A-axis (or the B-axis) by the position commanding value commanding the position of the reversed axis being detected. This position commanding value is the position commanding value commanding to move through the position of the reversed axis or the position commanding value corresponding to the position of the reversed axis. Next, the allowable acceleration deciding section 107 is input the machine character according to the machining profile at the position of the reversed axis decided by the profile deciding section 105 from the machine character memorizing section 106. Then, the allowable acceleration deciding section 107 decides the allowable acceleration of the A-axis (or the B-axis) based on the input machine character and the allowable angular error θ1 (or θ2).

As explained above, the distance L1 (or L2) is the distance between the commanded machining position P1, by the position commanding value commanding the position of the reversed axis, and the center line of the rotational axis being reversed. It may be possible that the distance L1 (or L2) is a distance between the position of the reversed axis and the center of the rotational axis being reversed.

Here is explained where the allowable acceleration of the X-axis (or the Y-axis, the Z-axis) being the linear axis is decided. At first, the allowable acceleration deciding section 107 is input from the machine character memorizing section 106 the machine character according to the machining profile at the position of the reversed axis decided by the profile deciding section 105. Then, the allowable acceleration deciding section 107 decides the allowable acceleration of the X-axis (or the Y-axis, the Z-axis) based on the input machine character and the allowable position error Δ. In this way, the allowable acceleration of the X-axis (or the Y-axis, the Z-axis) being the linear axis is absolutely decided as the machine character shown in FIG. 8 by using the allowable position error Δ being set. On the other hand, the allowable acceleration of the A-axis (or the B-axis) being the pivoting axis is variably decided as the machine character shown in FIGS. 8A, 8B and 8C by calculating the allowable angular error θ1 (or θ2) also. Therefore, the allowable acceleration deciding section 107 decides the allowable acceleration of the pivoting axis on a basis of the machining character and the allowable position error or the machining character and the allowable angular error.

The controlling section 108 is a controlling member controlling the velocity of the motor of the driving axis on a basis of the allowable acceleration decided by the allowable acceleration deciding section 107. The allowable acceleration deciding section 107 calculates a commanding velocity of the motor for the driving axis, calculated from the velocity commanding value included in the control datum to command the velocity of the tool relative to the workpiece, and a moving velocity, calculated from the allowable acceleration, in machining by the machine tool 1 on a basis of the control datum. Next, a velocity reduction rate is calculated from a ratio of the commanding velocity and the moving velocity about the driving axis. Then, the controlling section 108 controls the velocity about the driving axis by amending the velocity commanding value based on the velocity reduction rate. In the one embodiment of the present invention, therefore, the controlling section 108 controls the velocity about the driving axis by changing the amount of an override in accordance to the velocity reduction rate in order to amend the velocity commanding value based on the velocity reduction rate at the machining position of the reversed axis.

Thereby, it is sufficiently reduced the velocity about the driving axis at the beginning of machining the detected position of the reversed axis. Therefore, it can be controlled the reduced acceleration within the allowable acceleration in controlling the velocity about the driving axis until the position of the reversed axis. Thus, the controlling section 108 controls the velocity about the driving axis so that each of acceleration of the driving axes does not beyond the allowable acceleration.

Hereinafter, it will be explained targets of which the velocity is controlled by the controlling section 108. It is needed to reduce the acceleration under the allowable acceleration from the beginning position of the machining to the position of the reversed axis by the position commanding value (Dn) commanding the position of the reversed axis in order to reduce the velocity about the driving axis to zero at the position of the reversed axis. For this purpose, it calculates the commanding velocity and the moving velocity about the driving axis which is reversed. The velocity commanding value which is the target of controlling the velocity by the controlling section 108 is amended about the position commanding value (Dn) commanding the position of the reversed axis since the value of the commanding velocity beyond the moving velocity. Thereby, the velocity about the driving axis is sufficiently reduced at the beginning of the machining by the position commanding value (Dn).

In this case, the velocity about the driving axis should be reduced at previous position commanding value (Dn−1) before the position commanding value (Dn) commanding the position of the reversed axis. Therefore, the controller 108 has also another target of controlling to reduce the velocity about driving axis at this position. This is because the acceleration should be under the allowable acceleration from the beginning of machining at the position commanding value (Dn−1) to the beginning of machining at the position commanding value (Dn). For this purpose, it calculates the commanding velocity and the moving velocity about the driving axis, which is reversed, about the position commanding value (Dn−1). The velocity commanding value which is the target of controlling the velocity by the controlling section 108 is amended about the position commanding value (Dn−1) where the value of the commanding velocity beyond the moving velocity. Thereby, the velocity about the driving axis is sufficiently reduced at the beginning of the machining by the position commanding value (Dn−1).

The controlling section 108 is to have the targets by repeating this process to the position commanding value (Dn−m) that is before the position commanding value (Dn−m+1) where the commanding velocity about the driving axis which is reversed is under the moving velocity. Therefore, the controlling section 108 controls the velocity by deciding the position commanding values (Dn to Dn−m) which are target gone upstream from the position commanding value (Dn) commanding the position of the reversed axis not so as to beyond the value of the acceleration of each of the driving axes at any position commanding values (Dn to Dn−m). While the controlling section 108 decides the target of controlling the velocity, it may be constructed that the controlling section 108 selects, as the target of controlling the velocity, the fixed position commanding value or a suitable numbers of the position commanding values for simplifying.

Effects of the One Embodiment of the Present Invention

The controller 100 for the machine tool 1 according to the present invention has the construction to detect the machining position of the reversed axis and control the velocity about the driving axes by the controlling section 108. It is well known that the machining error caused by the axis reversing depends on the acceleration of the driving axis having the axis reversing. It has a tendency that the larger the distances L1, L2 are, the larger the machining error is, at machining by controlling the driving axis. The one embodiment of the present invention calculates the allowable acceleration of the rotational axis on a basis of the allowable angular errors θ1, θ2 calculated in accordance with the distances L1, L2 and the allowable position error Δ.

Thereby, the velocity control about the rotational axis can be executed adequately. Therefore, it can be done for the present invention to prevent from generating any quadrant projection caused by the axis reversing of the pivoting axis to create possible machining error at the machining place of the reversed axis, thereby to improve the machining accuracy. The velocity control can be executed to the position commanding value commanding the machining position of the reversed axis from plural position commanding values included in the control datum in the present invention. Therefore, it can be done for the velocity control of the present invention to give any unnecessary reduction of the velocity to other position commanding values, thereby to reduce a machining time compared to the case where the machining velocity is reduced to all of the control datum to reduce the machining error. It can be determined the precise allowable acceleration of the rotational axis by calculating the allowable angular errors θ1, θ2 of the rotational axis referring to the distances L1, L2.

The controller 100 is constructed to detect the machining position of the reversed linear axis and control the velocity about the driving axes including the linear axis by the controlling section 108. Therefore, it can be done for the present invention to prevent from generating of any quadrant projection caused by the axis reversing of the linear axis in machining with controlling the driving axis including the linear and rotational axes, thereby to improve the machining accuracy.

Where the controller 100 detects the machining position of the reversed axes of the linear and rotational axes, it detects machining positions of the plural driving axes at certain position commanding value. In this case, it can reduce the generation of the machining errors based on the reversing axis by controlling the velocity in accordance to the allowable acceleration being calculated.

The allowable acceleration deciding section 107 is constructed to decide the allowable acceleration of the driving axis on a basis of the machining character and the allowable position error $\Delta$ or the allowable angular errors $\theta1$, $\theta2$, thereby to decide more adequate allowable acceleration referring to the machine character of the machine tool 1. This machine character follows the machining profile at the machining position of the reversed axis.

Thereby, the allowable acceleration deciding section 107 can decide the adequate allowable acceleration based on the machine character according to the machining profile. Therefore, during machining the straight line segment where the machining profile at the position of the reversed axis affects the machining accuracy largely, it can be restricted the machining error by the axis reversing by the way of reducing the velocity with the small acceleration. During machining the corner segment where the machining profile at the position of the reversed axis affects the machining accuracy relatively small, it can be restricted the machining error by the axis reversing by the way of restricting the excess reduction of the velocity. Therefore, it can shorten the machining time compared to that in controlling the velocity with uniform reduction.

The controlling section 108 is constructed to control the velocity about the driving axis by amending the velocity commanding value at machining by the machine tool 1 on a basis of the control datum. Therefore, the controlling section 108 calculates the reduction rate of the velocity from the ratio of the commanded velocity and the actual velocity about the driving axis, and controls the velocity by switching the override according to the reduction rate of the velocity. Thereby, the driving axis is reduced sufficiently its velocity at the beginning of the machining by each of the position commanding values included in the target controlled the velocity so that the acceleration in controlling the velocity until the position of the reversed axis is within the allowable acceleration. Therefore, it can refer the allowable acceleration firmly and easily so that it can control the velocity about the driving axis with restraining the machining error by the axis reversing steadily.

While the invention has been described in detail with reference to the preferred embodiment, it will be apparent to those skilled in the art that the invention is not limited to the present embodiment, and that the invention may be realized in various other embodiments within the scope of the claims.

For example, while the controlling section 108 amends the velocity commanding value by switching the override in accordance with the reduction rate of the velocity calculated on a basis of the velocity commanding value and the allowable acceleration included in the control datum, thereby to control the velocity. However, it may be constructed that the controlling section 108 may amend the velocity commanding value itself included in the control datum without switching the override before the machine tool 1 machines based on the control datum, thereby to control the velocity about the driving axis.

In one embodiment of the present invention, the controlling section 108 switches the override in accordance with the reduction rate of the velocity during the machining by the machine tool, and controls the velocity by outputting the commanding value to a driver of the driving axis controlling in the feedback way. On the other hand, the controlling section 108 may be constructed that it calculates the amending value of the velocity commanding value according to the reduction rate of the velocity at first. Then, the controlling section 108 rewrite the velocity commanding value to the amending value previously before the machine tool machines based on the control datum. Thus, the controlling section 108 may be constructed to control the velocity about the driving axis by amending the velocity commanding value included in the control datum being memorized.

Thereby, where the machine tool 1 machines the workpiece based on the amended control datum, the driving axis reversed its axis is sufficiently reduced its velocity at the beginning position of machining by the position commanding value commanding the position of reversed axis. Then, the velocity is reduced with the sufficient small acceleration by controlling the velocity from the beginning position of the machining to the position of the reversed axis by the position commanding value commanding the position of the reversed axis so that the acceleration is within the allowable acceleration at the position of the reversed axis. Thereby, it can control the velocity more adequately in referring to the allowable acceleration so that it restrains the generation of the machining error by the axis reversing steadily.

The controlling section 108 may be constructed to control the velocity of the driving axis by combining adequately of rewriting the velocity commanding value and switching the override. By this construction, it can rewrite the velocity commanding value to the adequate value previously, and further switch the override when the machine tool machines based on the control datum, thereby to control the velocity more correctly. Thereby, it can reduce inadequate reduction of the velocity, thereby to improve the machining accuracy. The method to rewrite the velocity commanding value may executed that it detects the position commanding value in the NC program corresponding to the position commanding value commanding the position of the reversed axis and then rewrites the velocity commanding value of this position commanding value, thereby performing same effects.

For example, while the tool 60 is pivoted along the A-axis and the workpiece W is pivoted along the B-axis in the machine tool 1 of the five-axis simultaneous control machining center, however it may be constructed that the tool 60 is pivoted along the A-axis and the B-axis as a vertical machining center. The five-axis simultaneous control machining center may have a tilting table with the rotational table to pivot the workpiece along the A-axis and the B-axis. In each of these machining centers, it calculates the allowable angular errors $\theta1$, $\theta2$ on a basis of the distances L1, L2 and the allowable position error $\Delta$. The present invention is applied to each of the different types of the machining center by using a different machine character according to each type of the machining center in order to decide the adequate allowable acceleration of the driving axis in each type of machining centers, thereby to control the velocity based on the decided acceleration, restraining the generation of the machining error at the position of the reversed axis.

What is claimed is:

1. A controller for a machine tool controlling a machining position and a machining attitude of a tool relative to a workpiece by driving any of motors for driving axes including a linear axis and a pivoting axis based on a control data, said controller for said machine tool comprising;

a detecting member detecting said machining position where said pivoting axis is reversed in machining by said machine tool based on said control data;

an allowable position error setting member setting an allowable position error between a commanded machining position and an actual machining position;

an allowable angular error calculating member calculating an allowable angular error of a difference between a commanded angle of said pivoting axis and an actual angle of said pivoting axis based on said allowable position error and a distance;

an allowable acceleration deciding member deciding an allowable acceleration about said pivoting axis based on said distance which is a distance from said machining position of said reversed axis to a center of said pivoting axis and based on said allowable position error being set or said allowable angular error; and a controlling member controlling a velocity about said driving axis based on said allowable acceleration.

2. A controller for a machine tool according to claim 1, wherein;

said controller for said machine tool further comprises a machine character memorizing member memorizing a machine character of said machine tool being previously set based on an actual position difference between said commanded machining position and said actual machining position measured in an actual operation of said machine tool;

said machine character is a character having said allowable acceleration being different in accordance to a construction of said machine tool; and said allowable acceleration deciding member decides said allowable acceleration about said pivoting axis based on said machine character and said allowable position error.

3. A controller for a machine tool according to claim 2, wherein said allowable acceleration deciding member decides said allowable acceleration about said pivoting axis based on said machine character and said allowable position error or based on said machine character and said allowable angular error.

4. A controller for a machine tool according to claim 1, wherein said allowable acceleration deciding member decides said allowable acceleration about said pivoting axis based on said allowable position error and a machining profile at said machining position of said reversed axis being detected.

5. A controller for a machine tool according to claim 4, wherein;

said controller for said machine tool further comprises a machine character memorizing member memorizing a machine character corresponding to said machining profile at said machining position of said reversed axis; and said allowable acceleration deciding member decides said allowable acceleration about said pivoting axis based on said machine character and said allowable position error.

6. A controller for a machine tool according to claim 5, wherein said allowable acceleration deciding member decides said allowable acceleration about said pivoting axis based on said machine character and said allowable position error or based on said machine character and said allowable angular error.

7. A controller for a machine tool according to claim 6, wherein;

said detecting member further detects said machining position of said reversed axis of a linear axis in machining by said machine tool based on said control data; and said allowable acceleration deciding member decides said allowable acceleration about said driving axis of said pivoting axis or said linear axis based on said machine character and said allowable position error or based on said machine character and said allowable angular error.

8. A controller for a machine tool according to claim 6, wherein said controlling member controls said velocity by amending a velocity commanding value, included in said control data, of said tool relative to said workpiece at said detected machining position of said reversed axis on a basis of a commanding velocity calculated from said velocity commanding value about said driving axis and based on a moving velocity about said driving axis calculated from said allowable acceleration.

9. A controller for a machine tool according to claim 8, wherein said controlling member calculates a velocity reduction rate from a ratio of said commanding velocity and said moving velocity, and amends said velocity commanding value by switching an override according to said velocity reduction rate in machining based on said velocity commanding value commanding said commanding velocity by said machine tool.

10. A controller for a machine tool according to claim 8, wherein said controlling member calculates a velocity reduction rate from a ratio of said commanding velocity and said moving velocity, and amends said velocity commanding value by rewriting previously said velocity commanding value commanding said commanding velocity to an amending value according to said velocity reduction rate before machining based on said control data by said machine tool.

11. A controller for a machine tool according to claim 1, wherein said allowable angular error calculating member calculates the allowable angular error as arcsin of said allowable position error divided by said distance.

12. A five-axis simultaneous control machine tool controlled by a controller for a machine tool, comprising;

a bed;

a spindle housing mounted movably on said bed to support a tool;

a table mounted movably on said bed to support a workpiece;

said spindle housing and said table are moved relatively along three linear axes and also pivoted relatively along two pivoting axes; and said controller for said five-axis simultaneous control machine tool controlling a machining position and a machining attitude of said tool relative to said workpiece by driving any of motors for driving axes including said three linear axes and said two pivoting axes based on a control data, comprising;

a detecting member detecting said machining position where said pivoting axis is reversed in machining by said machine tool based on said control data;

an allowable position error setting member setting an allowable position error between a commanded machining position and an actual machining position;

an allowable angular error calculating member calculating an allowable angular error of a difference between a commanded angle of said pivoting axis and an actual angle of said pivoting axis based on said allowable position error and a distance;

a machine character memorizing member memorizing previously a machine character of said machine tool based on an actual position difference between said commanded machining position and said actual machining position measured in an actual operation of said machine tool;

an allowable acceleration deciding member deciding an allowable acceleration about said pivoting axis based on said machine character and said allowable position error or based on said machine character and said allowable angular error; and a controlling member controlling a velocity about said driving axis based on said allowable acceleration.

13. A five-axis simultaneous control machine tool controlled by a controller for a machine tool, comprising;

a bed;

a spindle housing mounted movably on said bed to support a tool;

a table mounted movably on said bed to support a workpiece;

said spindle housing and said table are moved relatively along three linear axes and also pivoted relatively along two pivoting axes; and said controller for said five-axis simultaneous control machine tool controlling a machining position and a machining attitude of said tool relative to said workpiece by driving any of motors for driving axes including said three linear axes and said two pivoting axes based on a control data, comprising;

a detecting member detecting said machining position where said pivoting axis is reversed in machining by said machine tool based on said control data;

an allowable position error setting member setting an allowable position error between a commanded machining position and an actual machining position;

an allowable angular error calculating member calculating an allowable angular error of a difference between a commanded angle of said pivoting axis and an actual angle of said pivoting axis based on said allowable position error and a distance;

a machine character memorizing member memorizing a machine character corresponding to a machining profile at said machining position of said reversed axis;

an allowable acceleration deciding member deciding an allowable acceleration about said pivoting axis based on said machine character and said allowable position error or based on said machine character and said allowable angular error; and a controlling member controlling a velocity about said driving axis based on said allowable acceleration.

14. A five-axis simultaneous control machine tool controlled by a controller for a machine tool according to claim 13, wherein said controlling member controls said velocity by amending a velocity commanding value of said tool relative to said workpiece at said detected machining position of said reversed axis included in said control data on a basis of a commanding velocity calculated from said velocity commanding value for said driving axis and based on a moving velocity about said driving axis calculated from said allowable acceleration.

15. A five-axis simultaneous control machine tool controlled by a controller for a machine tool according to claim 14, wherein said controlling member calculates a velocity reduction rate from a ratio of said commanding velocity and said moving velocity, and amends said velocity commanding value by switching an override according to said velocity reduction rate in machining based on said velocity commanding value commanding said commanding velocity by said machine tool.

16. A five-axis simultaneous control machine tool controlled by a controller for a machine tool according to claim 15, wherein said controlling member calculates a velocity reduction rate from a ratio of said commanding velocity and said moving velocity, and amends said velocity commanding value by rewriting previously said velocity commanding value commanding said commanding velocity to an amending value according to said velocity reduction rate before machining based on said control data by said machine tool.

* * * * *